US012567654B2

(12) United States Patent
Kim et al.

(10) Patent No.: US 12,567,654 B2
(45) Date of Patent: Mar. 3, 2026

(54) BUS BAR HAVING SURFACE PATTERN AND BATTERY MODULE COMPRISING SAME

(71) Applicant: LG Energy Solution, Ltd., Seoul (KR)

(72) Inventors: Kyung Mo Kim, Daejeon (KR); Jeong Oh Moon, Daejeon (KR); Jung Hoon Lee, Daejeon (KR); Ho June Chi, Daejeon (KR); Jin Yong Park, Daejeon (KR); Hee Jun Jin, Daejeon (KR); Jhin Ha Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1082 days.

(21) Appl. No.: 17/627,963

(22) PCT Filed: Jul. 31, 2020

(86) PCT No.: PCT/KR2020/010177
§ 371 (c)(1),
(2) Date: Jan. 18, 2022

(87) PCT Pub. No.: WO2021/025399
PCT Pub. Date: Feb. 11, 2021

(65) Prior Publication Data
US 2022/0255190 A1 Aug. 11, 2022

(30) Foreign Application Priority Data

Aug. 2, 2019 (KR) ........................ 10-2019-0094098

(51) Int. Cl.
H01M 50/503 (2021.01)
H01M 50/211 (2021.01)
H01M 50/516 (2021.01)

(52) U.S. Cl.
CPC ....... *H01M 50/503* (2021.01); *H01M 50/211* (2021.01); *H01M 50/516* (2021.01)

(58) Field of Classification Search
CPC . H01M 50/503; H01M 50/516; H01M 50/211
See application file for complete search history.

(56) References Cited

U.S. PATENT DOCUMENTS 6,327,157 B1 * 12/2001 Mann ................. H01R 12/7088
361/624
9,136,521 B2 * 9/2015 Lee ..................... H01M 50/528
(Continued)

FOREIGN PATENT DOCUMENTS

CN 104159695 A 11/2014
CN 104625389 A 5/2015
(Continued)

OTHER PUBLICATIONS

WO-2018221818MT (Year: 2018).*
(Continued)

*Primary Examiner* — Alexander Usyatinsky
(74) *Attorney, Agent, or Firm* — Lerner David LLP

(57) ABSTRACT

The present invention relates to a bus bar for connecting an electrode lead and a battery module comprising same. The bus bar has a surface structure having a concavity and convexity pattern aligned in one direction on a connection part with an electrode lead, and thus the weldability with the electrode lead can be enhanced.

14 Claims, 11 Drawing Sheets

(56) References Cited

U.S. PATENT DOCUMENTS

| | | | | |
|---|---|---|---|---|
| 2009/0145479 A1* | 6/2009 | Williams | | H10F 77/488 |
| | | | | 136/256 |
| 2012/0015550 A1* | 1/2012 | Ikeda | | H01R 4/242 |
| | | | | 439/391 |
| 2014/0205889 A1 | 7/2014 | Kim et al. | | |
| 2015/0001280 A1 | 1/2015 | Nakagawa et al. | | |
| 2015/0214530 A1 | 7/2015 | Lee | | |
| 2018/0123188 A1 | 5/2018 | Dawley et al. | | |
| 2018/0194235 A1 | 7/2018 | Kim et al. | | |
| 2018/0248166 A1 | 8/2018 | Ryu et al. | | |
| 2018/0269459 A1 | 9/2018 | Tsuchiya et al. | | |
| 2018/0287316 A1 | 10/2018 | Robert et al. | | |
| 2018/0315974 A1 | 11/2018 | Ing et al. | | |
| 2018/0315977 A1 | 11/2018 | Park et al. | | |
| 2019/0198848 A1 | 6/2019 | Onodera et al. | | |
| 2019/0305284 A1 | 10/2019 | Lee et al. | | |
| 2020/0006740 A1 | 1/2020 | Park et al. | | |
| 2020/0044224 A1 | 2/2020 | Lee et al. | | |

FOREIGN PATENT DOCUMENTS

| | | | | | |
|---|---|---|---|---|---|
| CN | 205752356 U | 11/2016 | | | |
| CN | 206271802 U | 6/2017 | | | |
| CN | 206742365 U | 12/2017 | | | |
| CN | 107925028 A | 4/2018 | | | |
| CN | 108713257 A | 10/2018 | | | |
| EP | 2757611 A1 | 7/2014 | | | |
| EP | 2821174 A1 * | 1/2015 | | | B23K 20/021 |
| JP | 2007109548 A | 4/2007 | | | |
| JP | 2011210482 A | 10/2011 | | | |
| JP | 2011249243 A | 12/2011 | | | |
| JP | 2012022964 A | 2/2012 | | | |
| JP | 2013176782 A | 9/2013 | | | |
| JP | 2015049930 A | 3/2015 | | | |
| JP | 2016119377 A | 6/2016 | | | |
| JP | 6110582 B1 | 4/2017 | | | |
| JP | 2018006215 A | 1/2018 | | | |
| JP | 2019032927 A | 2/2019 | | | |
| KR | 20140093619 A | 7/2014 | | | |
| KR | 20150089724 A | 8/2015 | | | |
| KR | 20160097013 A | 8/2016 | | | |
| KR | 20170066896 A | 6/2017 | | | |
| KR | 20180097897 A | 9/2018 | | | |
| KR | 20180119991 A | 11/2018 | | | |
| KR | 20180130281 A | 12/2018 | | | |
| KR | 20180133698 A | 12/2018 | | | |
| KR | 20190005529 A | 1/2019 | | | |
| KR | 20190027615 A | 3/2019 | | | |
| KR | 20190040248 A | 4/2019 | | | |
| WO | 2018/225920 A1 | 12/2018 | | | |
| WO | WO-2018221818 A1 * | 12/2018 | | | H01M 2/02 |

OTHER PUBLICATIONS

The decision of KPO to grant a Patent for Application KR 20190094098 (Year: 2025).*

The decision of JPO to grant a Patent for Application JP 2022501324 (Year: 2023).*

Extended European Search Report including Written Opinion for Application No. 20849463.3 dated Dec. 19, 2022, pp. 1-7.

Search Report dated Apr. 25, 2024 from the Office Action for Chinese Application No. 202080051245.0 issued Apr. 27, 2024, 2 pages.

International Search Report for PCT/KR2020/010177 dated Nov. 16, 2020. 2 pgs.

* cited by examiner

【FIG. 1】
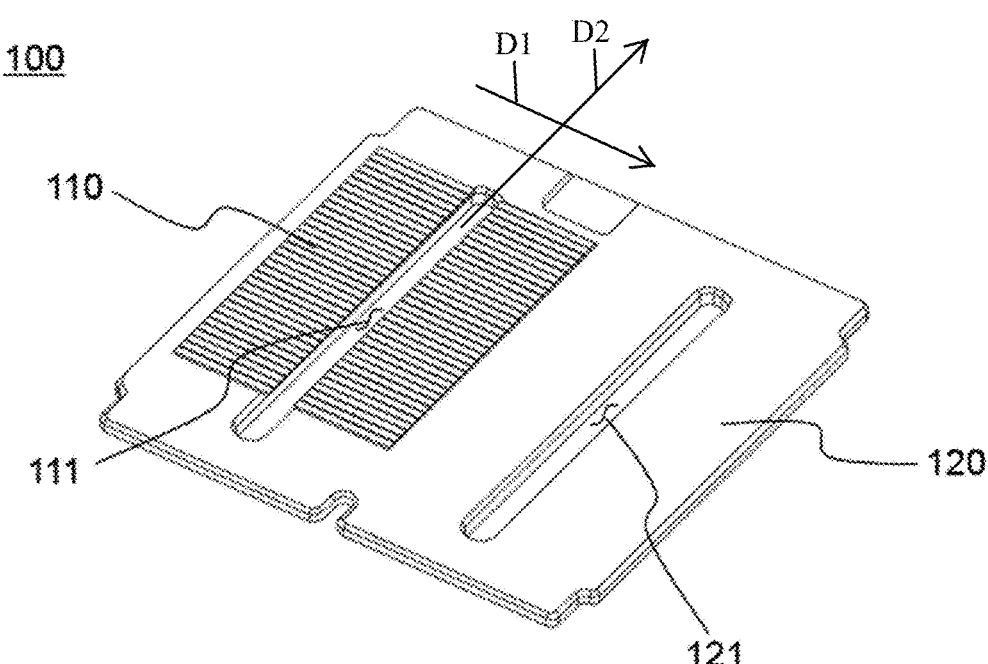

【FIG. 2】
110
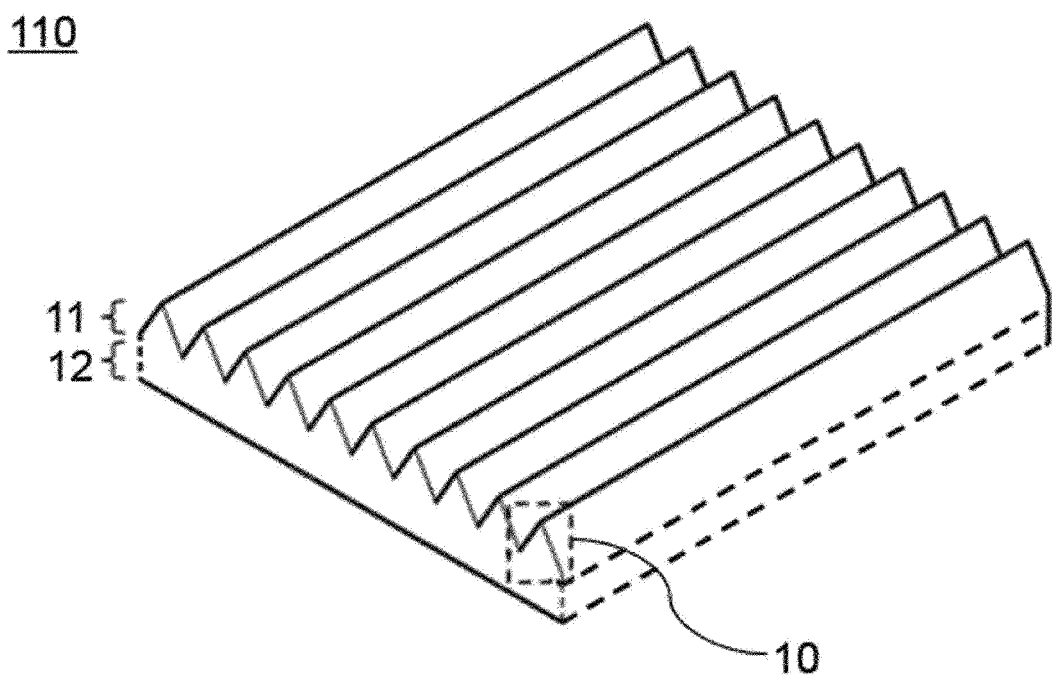
11 {
12 {
10

【FIG. 3】
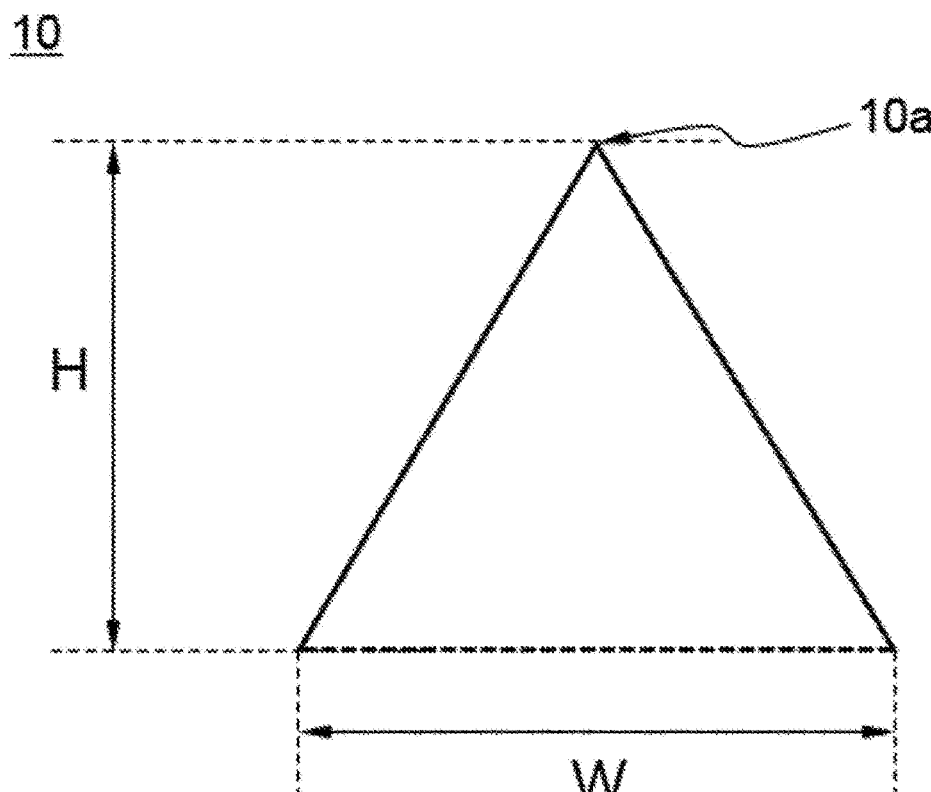

【FIG. 4】
10
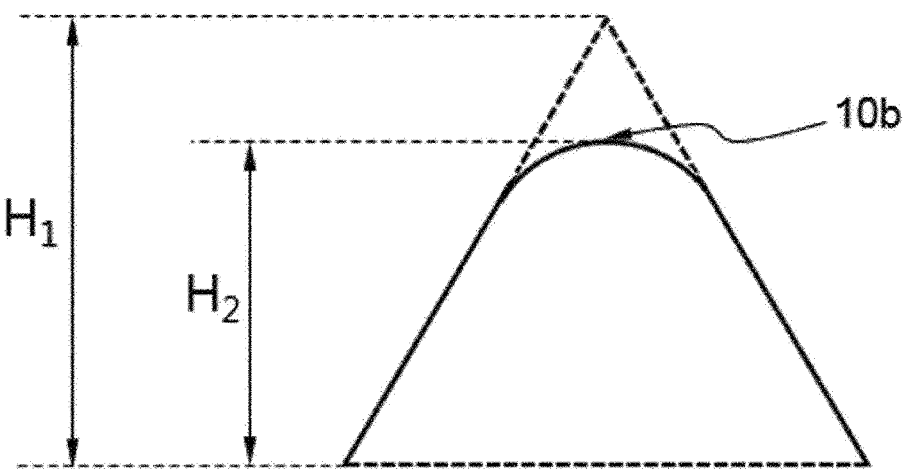

【FIG. 5】
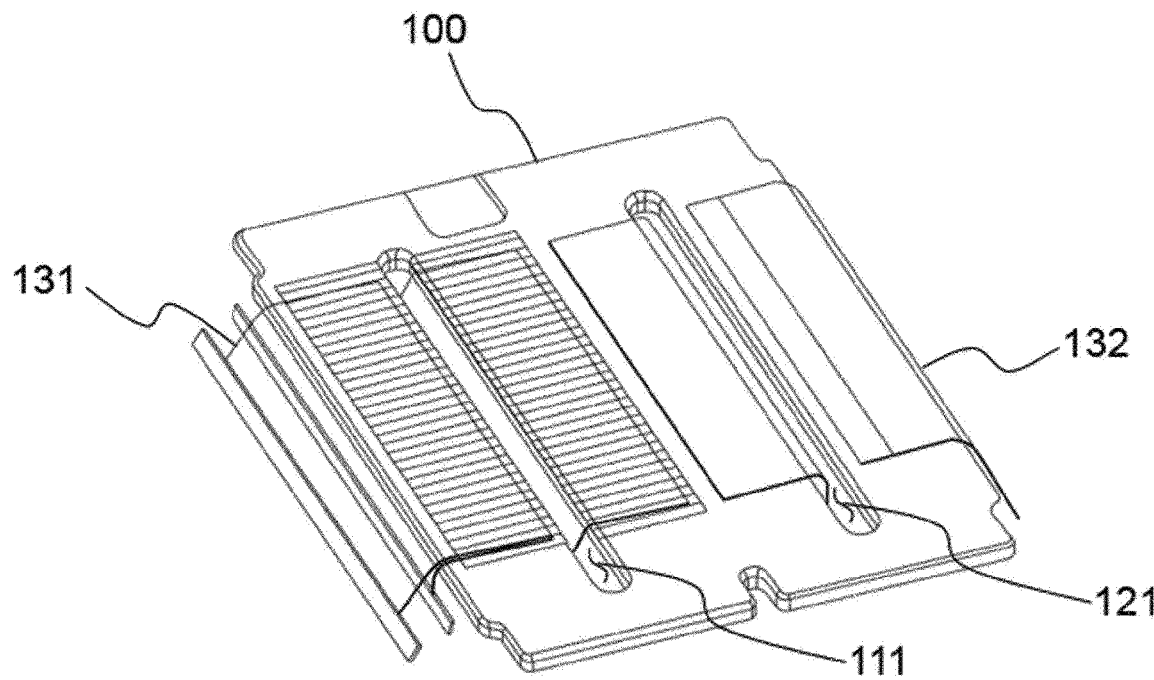

【FIG. 6】
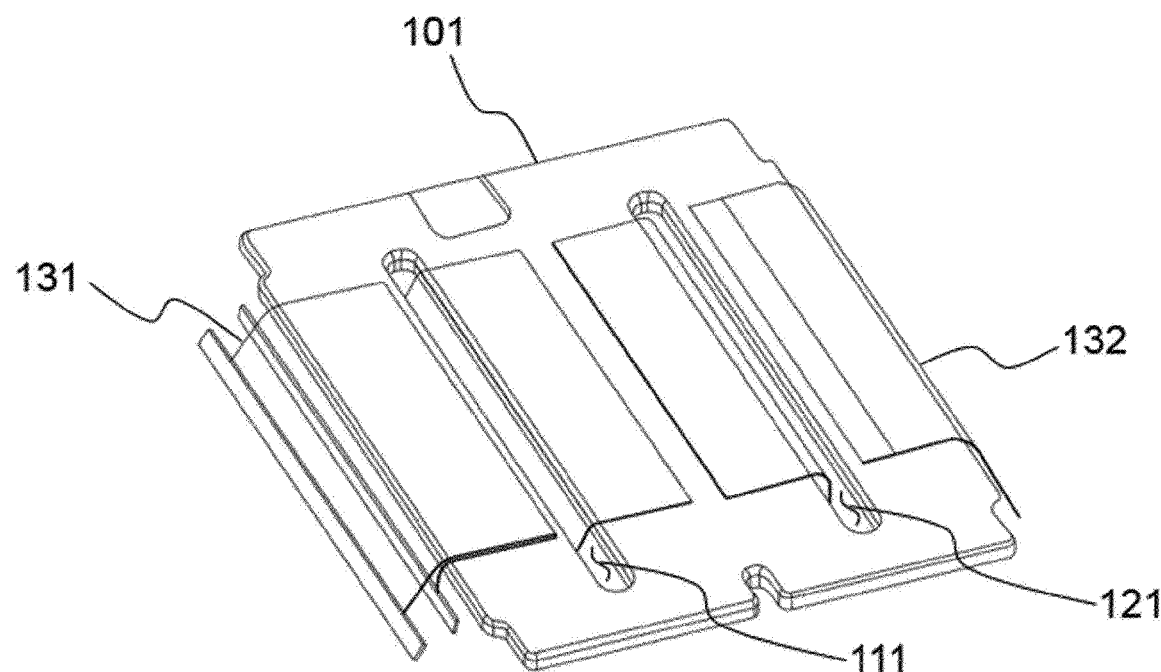

【FIG. 7】
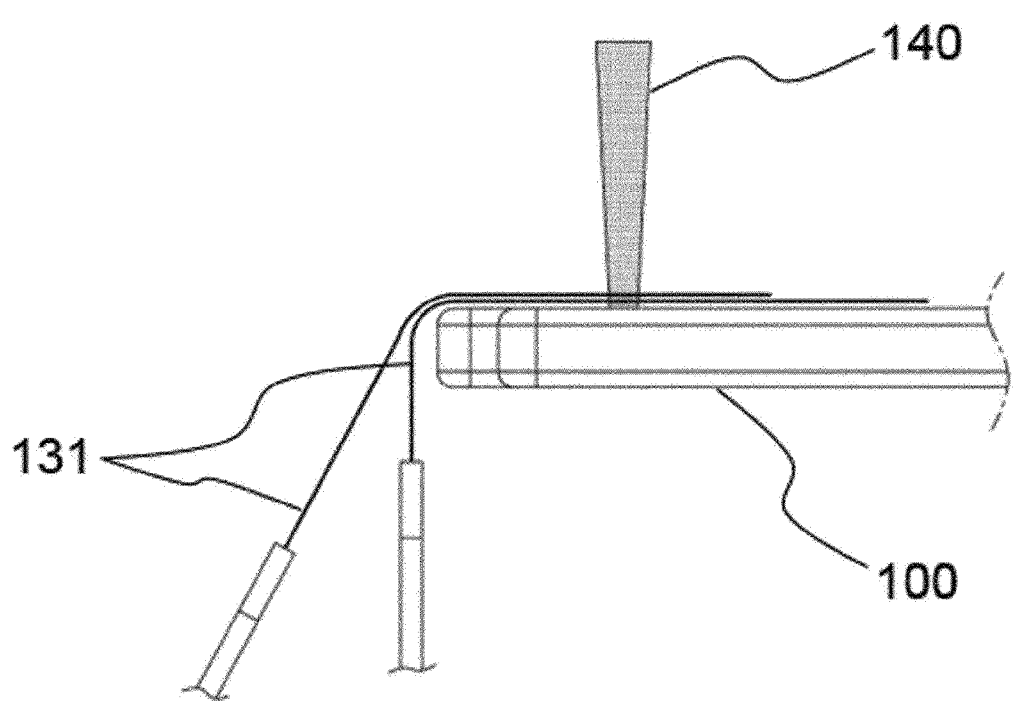

【FIG. 8】
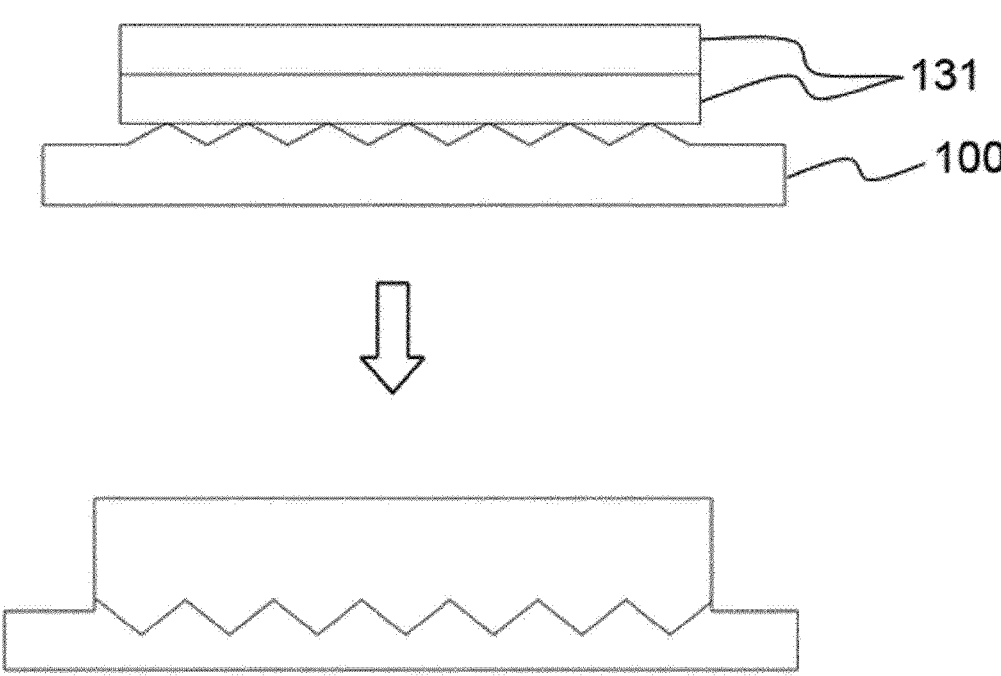

【FIG. 9】
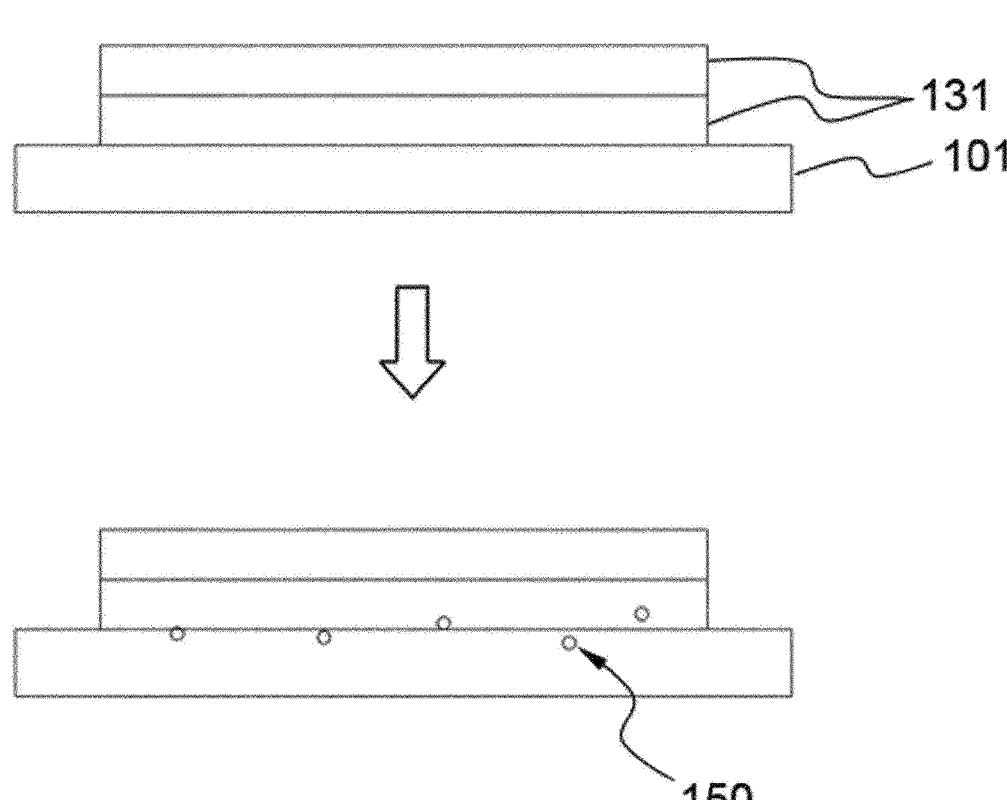

【FIG. 10】
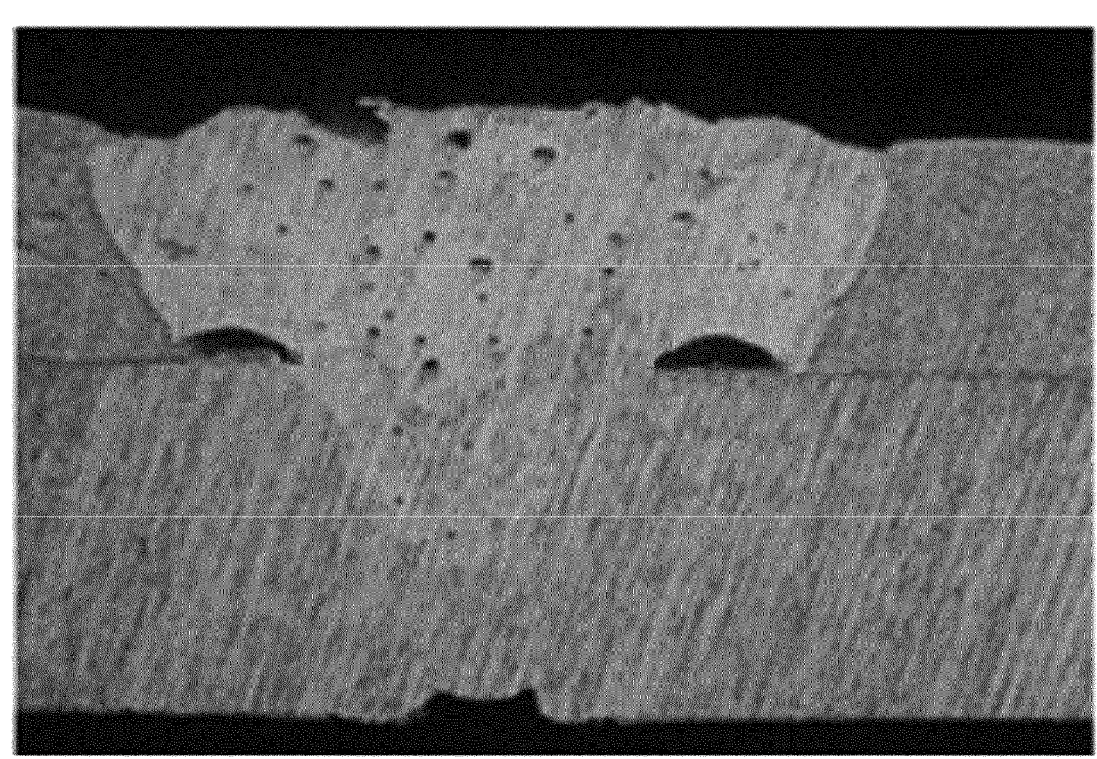

【FIG. 11】
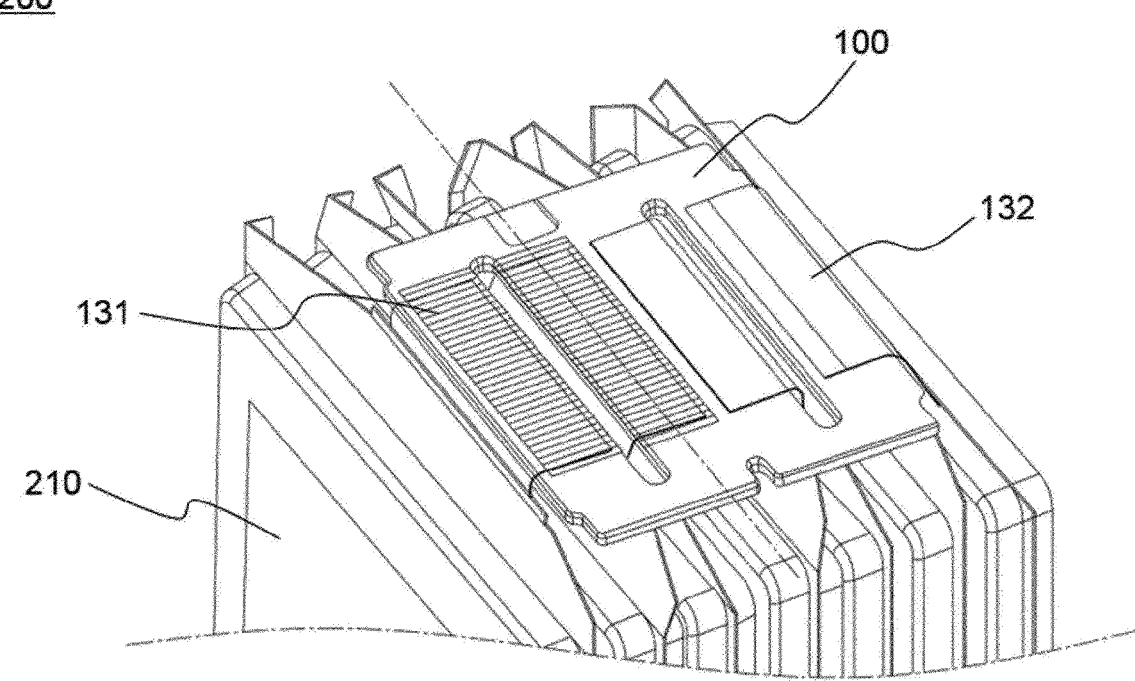

BUS BAR HAVING SURFACE PATTERN AND BATTERY MODULE COMPRISING SAME

CROSS-REFERENCE TO RELATED APPLICATIONS

The present application is a national stage entry under 35 U.S.C. § 371 of International Application No. PCT/KR2020/010177, filed on Jul. 31, 2020, published in Korean, which claims priority to Korean Patent Application No. 10-2019-0094098, filed on Aug. 2, 2019, the entire contents of which are hereby incorporated herein by reference.

TECHNICAL FIELD

The present invention relates to a bus bar for bonding electrode leads and a battery module including the same, and more particularly, to a bus bar having improved bonding property with an electrode lead, and a battery module including the same.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has attracted attention as an energy source of an electric vehicle, a hybrid electric vehicle, etc., which are proposed as a solution for air pollution of existing gasoline vehicles and diesel vehicles using fossil fuel.

As the application fields and products of secondary batteries are diversified as described above, the types of batteries are also diversified to provide appropriate output and capacity. In addition, batteries applied to the field and products are required to be miniaturized or lightweight.

In order to increase the output and capacity of the secondary battery, a plurality of battery cells are electrically connected to each other to form a packaged battery module. In particular, pouch-type secondary batteries are widely used in medium- to large-sized devices due to the advantage of easy stacking. Typically, a battery module of a medium or large-sized device is implemented through series and/or parallel connection of pouch-type secondary batteries.

Meanwhile, when configuring a battery module, the electrode leads of the pouch-type secondary battery are bent and contacted on the top surface of the bus bar, and then welded to bond them. Here, the bus bar means a rod-shaped conductor made of a material such as copper, silver, tin plating, or the like in a bar shape. Such a bus bar can safely conduct high-capacity current compared to copper wires, and is thus widely used as a wiring member in power supply devices including battery modules of electric vehicles.

However, in the case of the prior art, when the electrode lead and the bus bar are formed of different kinds of metals, there is a limitation that the bonding force by welding is not good. For example, when an aluminum electrode lead and a copper bus bar are bonded, pores may be formed at the bonding interface due to bubbles generated during a welding process between dissimilar metals, which causes a decrease in bonding strength.

DISCLOSURE

Technical Problem

The present invention is invented to solve the above problems and relates to a bus bar having improved interfacial bonding between an electrode lead formed of different metals and a bus bar, and a battery module including the same.

Technical Solution

The present invention provides a bus bar for bonding electrode leads and a battery module including the same.

In an embodiment of the present invention, the bus bar includes first and second junctions for surface bonding with first and second electrode leads, respectively, on one surface of a plate-shaped member, the first junction bonded to the first electrode lead has a surface structure patterned with irregularities oriented in one direction, and the second junction bonded to the second electrode lead has a surface structure in which irregularities are not formed.

In a specific example of the present invention, a first slit is formed in a central region of the first junction, and a second slit is formed in a central region of the second junction. The specific shape of the slit is not particularly limited unless the electrical contact with the electrode lead is impeded.

For example, the first and second slits each have a shape that crosses the first or second junction. Further, the first and second slits may be arranged parallel to each other. However, one or more of the first and second slits may or may not be formed. In addition, in the process of forming the battery module, the directions in which the first and second slits are formed may vary according to the stacking direction of the battery cells.

In the present invention, the uneven pattern formed on the bus bar is to facilitate the discharge of air bubbles discharged during the welding process. Accordingly, the shape or direction in which the uneven pattern is oriented can be variously modified within a range that does not inhibit air bubble discharge.

In an embodiment of the present invention, the first junction has a surface structure patterned with irregularities oriented in a direction perpendicular to a direction of a long axis of the slit. In this case, one end of the uneven pattern may have a structure in contact with the first slit. Through this, air bubbles generated at the interface during welding are discharged through the uneven pattern and the first slit. In the present invention, the long axis direction of the slit means the longitudinal direction in which the slit is formed, and correspondingly, the width direction of the slit becomes the short axis direction of the slit.

In another example, the first junction has a surface structure patterned with irregularities oriented in a direction parallel to the direction of the long axis of the slit. In this case, the uneven pattern formed in the first junction may be formed to be longer in a length direction than the area to which the first electrode lead is bonded. Here, the longitudinal direction means the orientation direction of the patterned irregularities. Through this, air bubbles generated at the interface during welding are discharged along the uneven pattern.

Further, in another example, the first junction has a surface structure patterned with irregularities oriented in a direction forming an acute angle with a direction of a long axis of the slit. In this case, one end of the uneven pattern may have a structure in contact with the first slit. Through this, air bubbles generated at the interface during welding are discharged through the uneven pattern and the first slit.

In the present invention, the direction in which the uneven pattern formed on the first junction is oriented may vary depending on the number or shape of the batteries stacked, the bending direction of the electrode lead and/or the welding process. The direction in which the uneven pattern is oriented can be variously changed within a range that does not inhibit the discharge of air bubbles generated during welding of the bus bar and the electrode lead.

In one embodiment of the present invention, one surface of the first junction at a side bonded to the first electrode lead has a pattern in which hills and valleys are repeated based on a cross-sectional shape, and an opposite surface at a side bonded to the first electrode lead has a flat cross-sectional shape. In a specific example, one surface of the first junction at a side bonded to the first electrode lead has a pattern shape in which triangular cross-sectional structures are repeated based on a cross-sectional shape, and an opposite surface at a side bonded to the first electrode lead has a flat cross-sectional shape. Here, in the triangular cross-sectional structure, the vertexes in the upward direction form a protruding "hill" of the uneven structure, and the vertexes in the lower two directions form a recessed "valley" of the uneven structure. In the present invention, when the cross-sectional shape in which hills and valleys are repeated is a triangular cross-sectional structure, the hill and valley portions include not only an angled case but also a rounded case.

In a specific example, one surface of the first junction at a side bonded to the first electrode lead has a pattern shape in which triangular cross-sectional structures are repeated based on a cross-sectional shape, and an opposite surface at a side bonded to the first electrode lead has a flat cross-sectional shape.

Further, in another specific example, one surface of the first junction at a side bonded to the first electrode lead has a pattern in which hills and valleys are repeated based on a cross-sectional shape, and a tip portion forming a hill is round.

In addition, the present invention provides a battery module including the bus bar described above. The above-described bus bar is applied for electrode lead bonding, and the battery module is a case in which two or more battery cells are electrically connected by the bus bar.

In one embodiment of the present invention, the battery module includes:

two or more battery cells stacked so that an electrode tab is oriented and protrude in one direction;

a first electrode lead and a second electrode lead electrically connected to the electrode tab of the battery cell at one side and bonded to the bus bar on the opposite side of the surface connected to the electrode tab of the battery cell; and a bus bar including a first junction and a second junction surface-bonded with the first electrode lead and the second electrode lead, respectively.

In a specific example, the first electrode lead and the bus bar are formed of different kinds of metals, and the second electrode lead and the bus bar are formed of the same kind of metal. In this case, for example, the first electrode lead is formed of aluminum or an alloy thereof, and the bus bar and the second electrode lead are formed of copper or an alloy thereof.

In addition, the first junction portion of the bus bar and the first electrode lead are partially fused to adhere to each other, and bubbles are not substantially present at the interface.

The structure in which bubbles are not substantially present includes not only a case where there are no bubbles at the interface, but also a case where a small number of bubbles or a small amount of bubbles exist within a range in which the bonding strength is hardly decreased.

In a specific example, the battery module includes all cases in which a plurality of battery cells or battery modules is electrically connected. The battery may be a secondary battery, specifically, a lithium secondary battery. In addition, the battery can be applied without limitation as long as the electrodes are arranged in one direction, and may be, for example, a pouch type battery.

Advantageous Effects

The bus bar according to the present invention improves welding bonding property and durability between an electrode lead formed of a different metal and a bus bar by forming a pattern on the surface of the bus bar, and can be used for bonding electrode leads of a battery module.

BRIEF DESCRIPTION OF THE DRAWINGS

FIG. 1 is a perspective view showing a bus bar according to an embodiment of the present invention.

FIG. 2 is a partially enlarged view showing a surface structure patterned with irregularities oriented in one direction formed at a first junction of a bus bar according to an embodiment of the present invention.

FIGS. 3 and 4 are schematic diagrams each showing an enlarged structure of irregularities according to an embodiment of the present invention.

FIG. 5 is a schematic diagram showing an electrode lead attached to a bus bar according to an embodiment of the present invention.

FIG. 6 is a schematic diagram showing an electrode lead attached to a bus bar according to a comparative example.

FIG. 7 is a schematic diagram showing a process of attaching an electrode lead to a bus bar through laser welding.

FIG. 8 schematically shows a process in which a first electrode lead is attached to a bus bar through welding according to an embodiment of the present invention.

FIG. 9 schematically shows a process in which a first electrode lead is attached to a bus bar through welding according to a comparative example.

FIG. 10 is a photograph of a junction cross-section of a bus bar and a first electrode lead according to a comparative example.

FIG. 11 is a perspective view showing a battery module according to an embodiment of the present invention.

DETAILED DESCRIPTION OF THE PREFERRED EMBODIMENTS

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present invention, the term "slit" is a generic term for a through hole having a long axis in one direction and a short axis in a direction perpendicular to the long axis, and includes cases of having a rectangle, oval, or bead shape.

In addition, in the present invention, the term "battery module" refers to a case in which a plurality of batteries are assembled, and may be referred to as a battery module or a battery pack in some cases.

FIG. 1 is a perspective view showing a bus bar according to an embodiment of the present invention. Referring to FIG. 1, the bus bar 100 according to the present invention is applicable for bonding electrode leads, and has two slits 111 and 121 formed on both sides thereof. In the bus bar 100, both upper surfaces of the first slit 111 are a first junction 110 that is in surface contact with a first electrode lead 131, and both upper surfaces of the second slit 121 are a second junction 120 that is in surface contact with a second electrode lead 132. The first junction 110 has a structure in which an uneven pattern oriented in a first direction D1 perpendicular to the a second direction D2 of a long axis of the first slit 111 is formed, and the second junction 120 has a structure in which a separate uneven pattern is not formed. For example, one end of the uneven pattern formed on the first junction 110 is in contact with the first slit 111. In the present invention, by forming an uneven pattern oriented in one direction in a bonding region with a first electrode lead on one surface of a bus bar, air bubbles generated in the welding process are smoothly discharged.

For example, the uneven pattern of the bus bar 100 is a structure formed in a cross-sectional shape in which hills and valleys are repeated, and the average distance between the hills can be described with reference to FIGS. 2 to 4.

In FIG. 2, the first junction 110 of the bus bar 100 forms a surface structure patterned with irregularities oriented in one direction. Specifically, the first junction 110 has a shape in which hills and valleys are repeated on one side and a flat shape on the opposite side, based on a cross section. The first junction 110 includes an upper portion 11 on which an uneven pattern is formed and a lower portion 12 on which an uneven pattern is not formed based on a cross section. The irregularities 10 formed on the upper portion 11 have a pattern in which a hill-shaped tip portion is repeated, and a structure in which a valley is formed between the tip portions is repeated.

The uneven pattern formed on the first junction may be formed in various shapes, sizes, or intervals, and may be derived through a welding test according to the shape of each battery cell and electrode lead. In one example, the average distance between a hill and a hill based on the cross-sectional shape of the first junction may be within 3 mm, and preferably within 2 mm. In addition, the average depth of the valleys in the first junction may be within 20% of the thickness of the bus bar, more preferably within 10%.

FIG. 3 is an enlarged view of the irregularities 10 disclosed in FIG. 2. In FIG. 3, the irregularities 10 have a shape in which cross sections of a triangular structure are repeated. In the triangular structure, a height H is formed from the base to a vertex 10a of the irregularities, and a width W of the base is formed. The effect of the irregularities 10, which include a structure of a pattern in which the tip portions in the form of valleys and hills are repeated, may vary depending on the height at which the vertex 10a of the hill is formed or at what width the width of the base (W) is formed.

Alternatively, the effect may vary depending on the ratio (H/W) of the height (H) of the irregularities 10 and the width (W) of the base. For example, if the height (H) of the irregularities 10 is too high, the interfacial bonding is insufficient during the welding process. On the contrary, if the height (H) of the irregularities 10 is too low, the effect of forming the uneven pattern is insignificant since air bubbles cannot be discharged smoothly. The width (W) of the base of the irregularities 10 also affects the interfacial bonding property and the bubble discharge effect. In FIG. 3, a case where the ratio (H/W) of the height (H) of the irregularities 10 and the width (W) of the base is 1 is illustrated.

In another example, as shown in FIG. 4, the triangular structure includes a case in which the tip portion 10b of the hill is formed in a round shape. In this case, the triangular structure forms a second height $H_2$ from the base to the vertex 10b of the hill. The irregularities 10 including the structure of the pattern in which the tip portions in the form of valleys and hills are repeated may have different effects depending on the height at which the round shape is formed. That is, effects such as a surface area of the first junction, interfacial bonding property with an electrode lead, or air bubble discharge efficiency of the irregularities 10 may be changed according to the ratio ($H_2/H_1$) of the height ($H_2$) to the vertex of the round shape to the height ($H_1$) from the base to the imaginary vertex. Although not disclosed separately in the present invention, the valley portion of the irregularities 10 may also be formed in a round shape. FIG. 4 illustrates a case that the ratio ($H_2/W$) of the height ($H_2$) of the irregularities 10 to the width of the base (W) is 0.7, and at the same time, the ratio ($H_2/H_1$) of the height ($H_2$) to the vertex of the round shape to the height ($H_1$) from the base to the virtual vertex is 0.7.

The cross-sectional shape of the irregularities 10 is not particularly limited, and may be changed, replaced, or improved and applied without departing from ordinary knowledge in the art.

FIG. 5 is a schematic diagram showing an electrode lead attached to a bus bar according to an embodiment of the present invention. For example, the bus bar 100 is formed of copper (Cu) or an alloy thereof, and a first electrode lead 131 formed of aluminum (Al) or an alloy thereof is attached to a first junction 110 located on both sides of the first slit 111. In addition, the second electrode lead 132 formed of copper (Cu) or an alloy thereof is attached to the second junction 120 positioned on each side of the second slit 121. The first electrode lead 131 is extended and bent from the left side of the bus bar 100 to be attached to the first junction 110, or extended and bent through the first slit 121 to thereby be attached to the first junction 110. In addition, the second electrode 132 is extended and bent from the right side of the bus bar 100 to be attached to the second junction 120, or extended and bent through the second slit 121 to thereby be attached to the second junction 120.

In particular, the first electrode lead 131 is attached to the first junction unit 110 in which the uneven pattern of the bus bar 100 is formed. The bus bar 100 and the first electrode lead 131 are formed of different types of metals, and as a result, weld bonding property is inferior. The present invention improves the bonding property with the first electrode lead 131 by forming the uneven pattern on the first junction 110.

FIG. 6 is a schematic diagram showing an electrode lead attached to a bus bar according to a comparative example. The bus bar 101 according to the comparative example has a structure in which a separate uneven pattern is not formed around the first slit 111. The bus bar 101 according to the comparative example is formed of copper or an alloy thereof, and the first electrode lead 131 is formed of aluminum or an alloy thereof. It is a generally known fact that the bus bar 100 and the first electrode lead 131 are formed of different types of metals, and that welding bonding between dissimilar metals is poor. Further, when the bus bar 101 formed of copper and the first electrode lead 131 formed of aluminum are joined by welding, bubbles are generated at the interface during welding to thereby form pores. Such pores cause further deterioration of the interfacial bonding property.

FIG. 7 is a schematic diagram showing a process of attaching an electrode lead to a bus bar through laser welding. Referring to FIG. 7, in a state in which two or more first electrode leads 131 are extended and bent to come into contact with one surface of the bus bar 100, welding is performed by irradiating a laser beam 140 from the upper portion. In the case of welding different types of metals using the laser beam 140, bubbles may be generated during welding, thereby forming pores.

FIG. 8 schematically illustrates a process in which the bus bar 100 and the first electrode lead 131 are attached through welding according to an embodiment of the present invention. First, the lower bus bar 100 is formed of copper or an alloy thereof, and has an uneven pattern oriented in one direction on its surface. The upper first electrode lead 131 is attached on the region of the bus bar 100 in which the uneven pattern is formed. The first electrode lead 131 is formed of aluminum or an alloy thereof. The number of the first electrode leads 131 may vary depending on the capacity of the battery module, and in the drawings, the two first electrode leads 131 are attached in an overlapping state. The type of welding is not particularly limited, and laser welding may be applied. When pressing while irradiating a laser beam for welding, the interface between the bus bar 100 and the first electrode lead 131 is partially fused and adhered to each other. During the welding process, bubbles are generated at the interface between the bus bar 100 and the first electrode lead 131, but are discharged through the uneven pattern 110.

In this regard, FIG. 9 schematically shows a process in which the bus bar 101 and the first electrode lead 131 are attached through welding according to a comparative example. The lower bus bar 101 is formed of copper or an alloy thereof, and has a structure in which a separate uneven pattern is not formed on the surface. The upper first electrode lead 131 is formed of aluminum or an alloy thereof. When pressing while irradiating a laser beam for welding, the interface between the bus bar 101 and the first electrode lead 131 is partially fused and adhered to each other by the irradiated laser beam. However, bubbles are generated during the welding process, which are trapped at the interface between the bus bar 101 and the first electrode lead 131 to form pores 150. As a result, as shown in FIG. 9, a plurality of pores 150 are formed at the interface between the bus bar 101 and the first electrode lead 131, which lowers the bonding force of the joint and reduces the durability of the battery or causes a short circuit.

FIG. 10 is a photograph of a junction cross-section of a bus bar and a first electrode lead according to a comparative example. The bonding of the bus bar 101 and the first electrode lead 131 was performed through laser welding as described in FIGS. 7 and 9. Specifically, the lower portion of the layer is a bus bar 101 formed of copper or an alloy thereof, and the upper portion of the layer is a first electrode lead 131 formed of aluminum or an alloy thereof. It can be seen that a number of pores are formed at the interface between the bus bar 101 and the first electrode lead 131 during laser welding.

FIG. 11 is a perspective view showing a battery module according to an embodiment of the present invention. The battery module 200 has a structure in which a plurality of battery cells 210 are electrically connected using the bus bar 100 according to the present invention. Specifically, the battery module 200 has a structure in which a plurality of pouch-type battery cells 210 are stacked in parallel, and the electrode of each of the battery cells 210 is extended by the electrode leads 131 and 132 to be electrically connected to the bus bar 100. Specifically, the battery cells 210 are stacked so that the electrode tabs (not shown) are oriented and protrude in one direction. Meanwhile, the first electrode lead 131 and the second electrode lead 132 are electrically connected to the electrode tab of the battery cell 210 at one side, and are bonded to the bus bar 100 on the opposite side of the surface connected to the electrode tab of the battery cell 210. The first and second electrode leads 131 and 132 are extended and bent to be joined to the bus bar 100 through welding while in contact with the upper surface of the bus bar 100. The bus bar includes a first junction unit and a second junction unit that are surface-contacted with the first electrode lead and the second electrode lead, respectively. The first junction unit is formed on both sides of the first slit, and the second junction unit is formed on both sides of the second slit. The first electrode leads 131 are bonded at both sides of the first slit 111, and the second electrode leads 132 are bonded at both sides of the second slit 121. In this case, an uneven pattern for bonding to the first electrode lead 131 is formed on both surfaces of the first slit 111 of the bus bar 100.

In the above case, the first electrode lead and the bus bar are formed of different kinds of metals, and the second electrode lead and the bus bar are formed of the same kind of metal. Specifically, the first electrode lead is formed of aluminum or an alloy thereof, and the bus bar and the second electrode lead are formed of copper or an alloy thereof. At this time, the first junction unit of the bus bar and the first electrode lead are partially fused to each other and are in close contact with each other.

Since the embodiments of the present invention are provided to more completely describe the present invention to a person skilled in the art, the shape and size of components in the drawings may be exaggerated, omitted, or schematically illustrated for clearer description. Therefore, the size or ratio of each component does not entirely reflect the actual size or ratio.

| <Description of reference numerals> | |
|---|---|
| 10: irregularities | 10a, 10b: tip portion of irregularities |
| 11: upper portion | 12: lower portion |
| H, $H_1$, $H_2$: height of the irregularities | W: width of irregularities |
| 100, 101: bus bar | 110: first junction |
| 111: first slit | 120: second junction |
| 121: second slit | 131: first electrode lead |
| 132: second electrode lead | 140: laser beam |
| 200: battery module | 210: battery cell |

The invention claimed is:

1. A bus bar for bonding electrode leads, the bus bar comprising:

a plate-shaped member having first and second junctions on a first surface thereof, the first and second junctions configured for surface bonding with first and second electrode leads, respectively, the plate-shaped member having a first slit that is a through hole extending therethrough in a central region of the first junction, wherein the first junction that is configured to be bonded to the first electrode lead has a surface structure patterned with irregularities extending in a first direction, the irregularities having a pattern on the first surface in which hills and valleys are repeated based on a cross-sectional shape, the first slit having a shape that crosses the valleys of the first junction, and wherein the second junction that is configured to be bonded to the second electrode lead has a planar surface structure in which the irregularities are not formed.

2. The bus bar of claim 1, wherein a second slit is formed in a central region of the second junction.

3. The bus bar of claim 2, wherein the second slit has a shape that crosses the second junction, and wherein the first and second slits are arranged parallel to each other.

4. The bus bar of claim 3, wherein the first direction is perpendicular to a second direction of a long axis of the first slit.

5. The bus bar of claim 3, wherein the first direction is parallel to a second direction of a long axis of the first slit.

6. The bus bar of claim 3, wherein the first direction forms an acute angle with a second direction of a long axis of the first slit.

7. The bus bar of claim 1, wherein a second surface of the plate-shaped member opposite to the first junction has a flat cross-sectional shape.

8. The bus bar of claim 1, wherein the irregularities have a pattern shape in which triangular cross-sectional structures are repeated based on a cross-sectional shape, and wherein a second surface of the plate-shaped member opposite to the first junction has a flat cross-sectional shape.

9. The bus bar of claim 7, wherein tip portions of the hills are rounded.

10. A battery module comprising the bus bar according to claim 1.

11. The battery module of claim 10, wherein the battery module comprises:

two or more battery cells stacked so that a first electrode lead of a first one of the battery cells and a second electrode lead of a second one of the battery cells are bonded to the bus bar on the first surface of the bus bar, the first surface of the bus bar facing away from the battery cells, wherein the first junction and a second junction are surface-bonded with the first electrode lead and the second electrode lead, respectively.

12. The battery module of claim 11, wherein the first electrode lead and the bus bar are formed of different types of metal, and wherein the second electrode lead and the bus bar are formed of a same metal.

13. The battery module of claim 11, wherein the first electrode lead is formed of aluminum or an alloy thereof, and wherein the bus bar and the second electrode lead are formed of copper or an alloy thereof.

14. The battery module of claim 11, wherein the first junction of the bus bar and the first electrode lead are partially fused to one another.

*  *  *  *  *